United States Patent [19]

Berg et al.

[11] 4,124,281
[45] Nov. 7, 1978

[54] SCHEME FOR TERMINAL GUIDANCE UTILIZING ACOUSTO-OPTIC CORRELATOR

[75] Inventors: Norman J. Berg, Baltimore; Burton J. Udelson, Bethesda, both of Md.

[73] Assignee: The United States of America as represented by the Secretary of the Army, Washington, D.C.

[21] Appl. No.: 804,204

[22] Filed: Jun. 7, 1977

[51] Int. Cl.² .................................................. G02F 1/32
[52] U.S. Cl. ..................................................... 350/358
[58] Field of Search .................. 350/96.13, 96.14, 358; 235/181; 333/30 R

[56] References Cited

U.S. PATENT DOCUMENTS 4,012,120  3/1977  Kagiwada ........................... 350/358

*Primary Examiner*—William L. Sikes
*Attorney, Agent, or Firm*—Nathan Edelberg; Robert P. Gibson; Saul Elbaum

[57] ABSTRACT

An analog terminal guidance system and device. One dimensional strips of a target scene are stored in a line in a longitudinally extending acousto-optic device as index of refraction variation pattern signals. Real time signals corresponding to the scene actually being viewed by the vehicle are propagated across the stored signals, and the results of an acousto-optic correlation are utilized to determine X and Y error. Scale error is compensated for by changing the data rate of the real time signals, and 2½ and 3D schemes improve the accuracy of the correlation.

5 Claims, 22 Drawing Figures

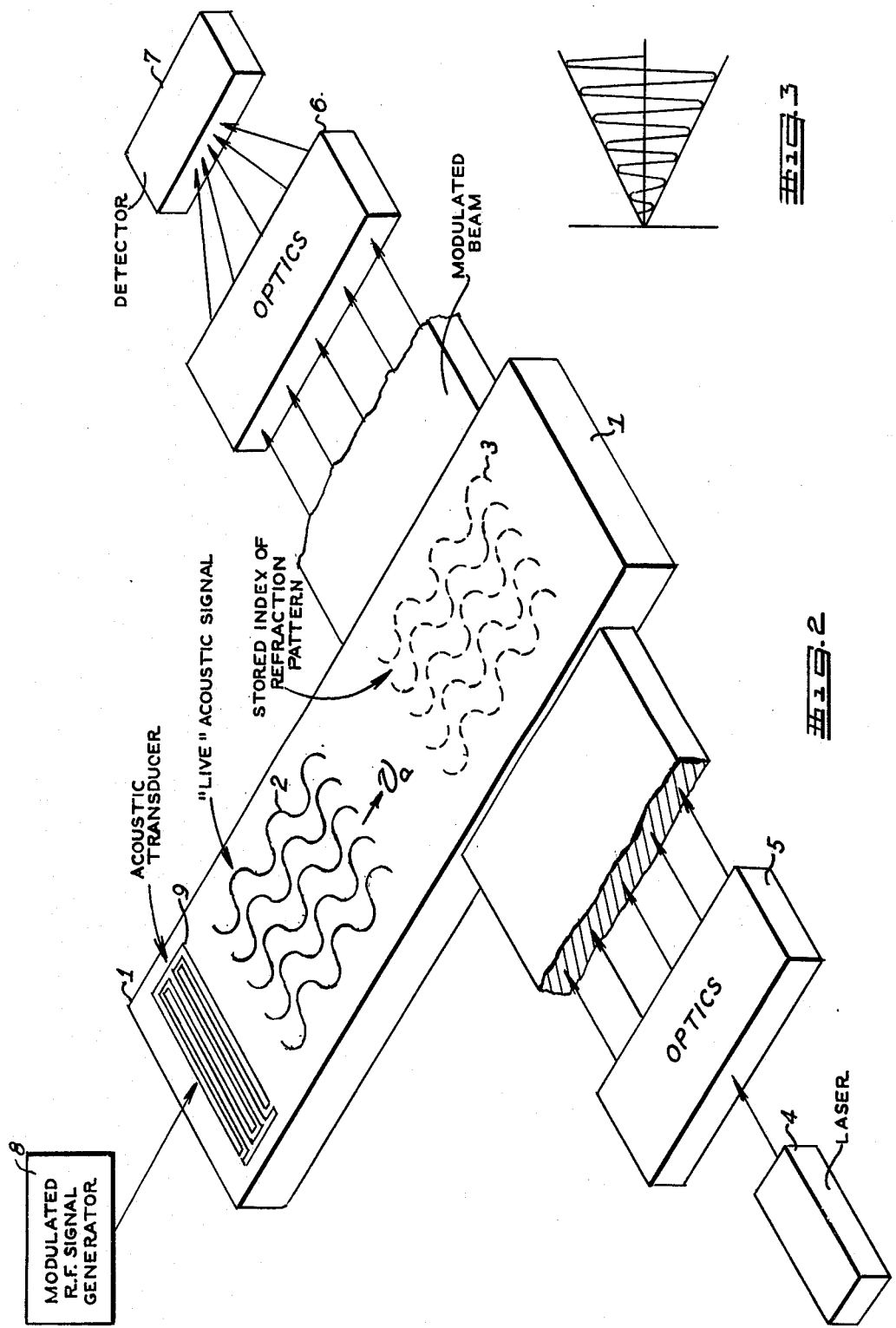

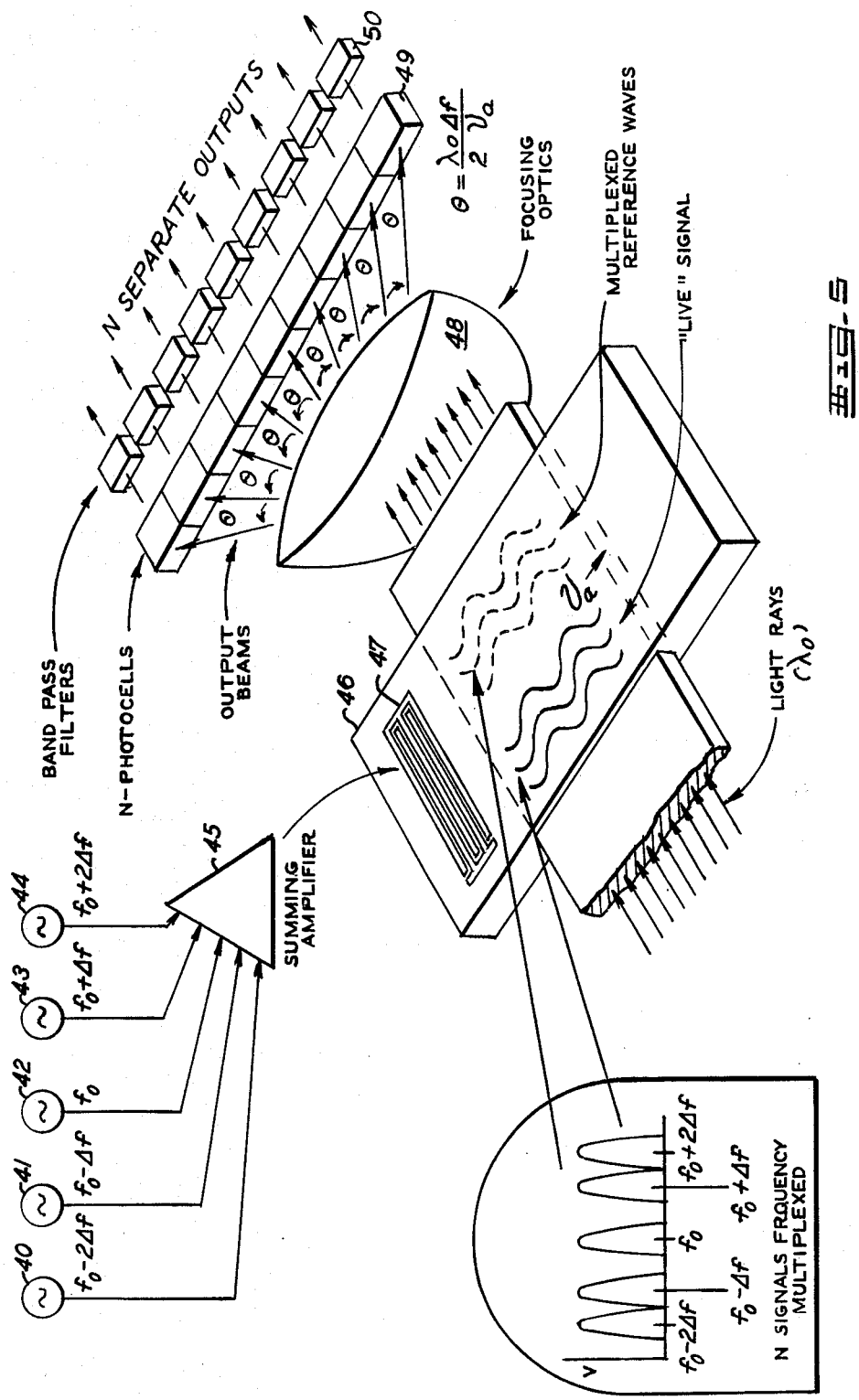

NO SHIFT
CORRELATION PATTERNS

10 PERCENT SHIFT
CORRELATION PATTERNS

20 PERCENT SHIFT
CORRELATION PATTERNS

ANALOG SIGNALS FROM
10 x 1 PIXEL ARRAY

PROBLEM:
 TO COMPRESS
 EXPANDED SIGNAL
 BY 20% TO
 OBTAIN MAXIMUM
 CORRELATION OUTPUT

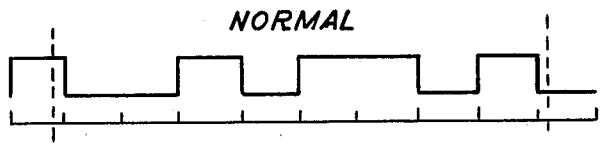
NORMAL

SOLUTION:
 INCREASE
 DATA ENCODED
 RATE BY 20%

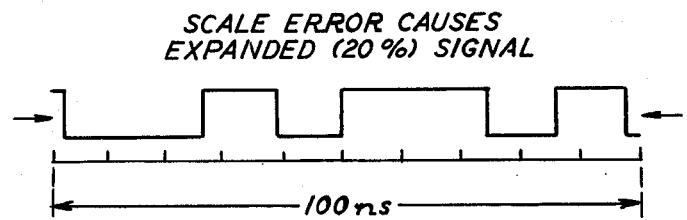
SCALE ERROR CAUSES
EXPANDED (20%) SIGNAL 100 ns

EXAMPLE:
 FOR 100 MHz CARRIER AND ONE PIXEL PER CYCLE (i.e. ONE PIXEL
 PER 10 ns) DATA RATE, A SIGNAL FROM 10 x 1 PIXEL ARRAY IS
 100 ns LONG. BY INCREASING DATA RATE TO ONE PIXEL PER
 8 ns, THE SIGNAL IS COMPRESSED TO 80 ns.

SCALING ERRORS

Fig. 12

SCHEME FOR TERMINAL GUIDANCE UTILIZING ACOUSTO-OPTIC CORRELATOR

RIGHTS OF THE GOVERNMENT

The invention described herein may be manufactured, used, and licensed by or for the United States Government for governmental purposes without the payment to us of any royalty thereon.

Reference will be made in the specification to Application Ser. Nos. 804,202; 804,203; and 804,206; all of which were filed on June 7, 1977, and, along with this application, are assigned to the U.S. Government.

The present invention is directed to an improved terminal guidance system and device.

The prior art has been concerned primarily with terminal guidance systems of a digital nature. However, digital systems possess some disadvantages, and these are obviated by the analog guidance system of the present invention. Thus, the system of the present invention does not require a large digital computer or an analog to digital converter, and it consumes less power, is lighter, and is less expensive than its digital counterpart.

It is therefore an object of the invention to provide an improved analog terminal guidance system and device.

It is a further object of the invention to provide an arrangement for compensating for scale error.

It is still a further object of the invention to provide a system which takes three dimensions into account in the determination of errors.

The invention will be better understood by referring to the accompanying drawings in which:

FIG. 2 is a diagrammatic illustration of the memory correlator device disclosed in co-pending Application Ser. No. 804,206.

FIG. 3 is a representative waveform which could be applied to the acoustic transducers shown in FIGS. 2 and 5.

Figure 4:
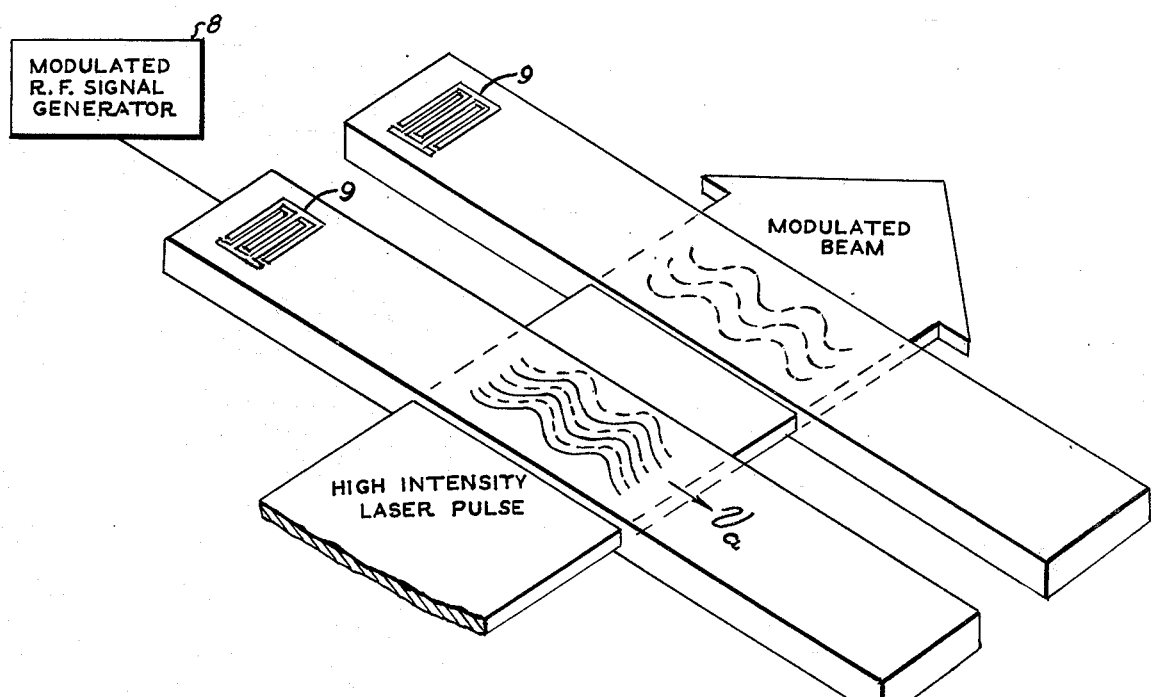

FIG. 4 illustrates two methods, disclosed in co-pending U.S. Application Ser. No. 804,206, for storing signals as index of refraction variation patterns in piezoelectric crystals.

Figure 5C:
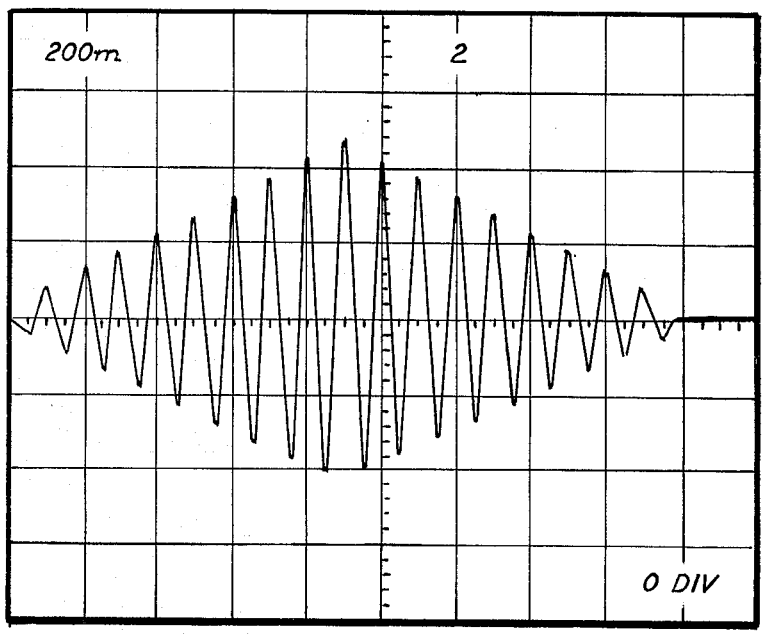
Figure 5D:
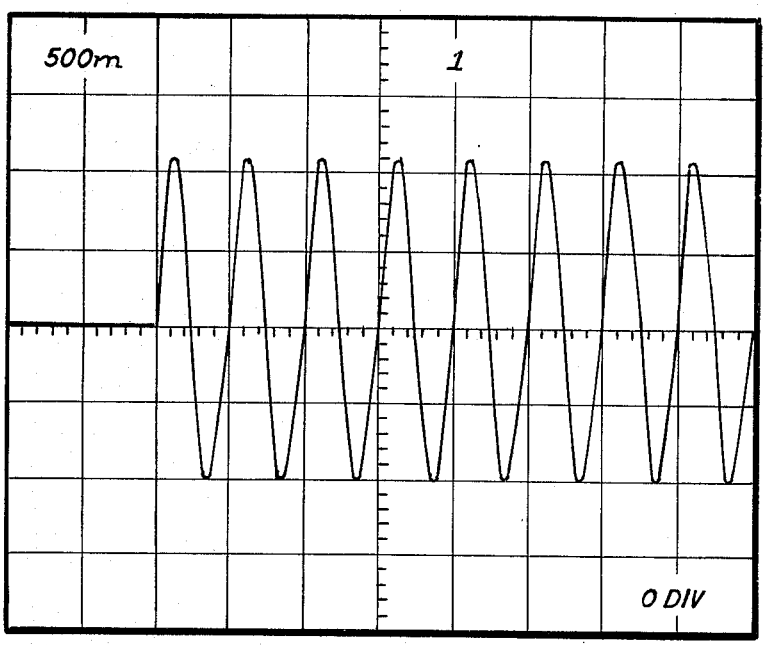

FIG. 5 is a diagrammatic illustration of a correlation device, using multiplexing techniques, for processing a plurality of signals simultaneously. This device is the subject of co-pending U.S. Application Ser No. 804,202.

Figure 6:
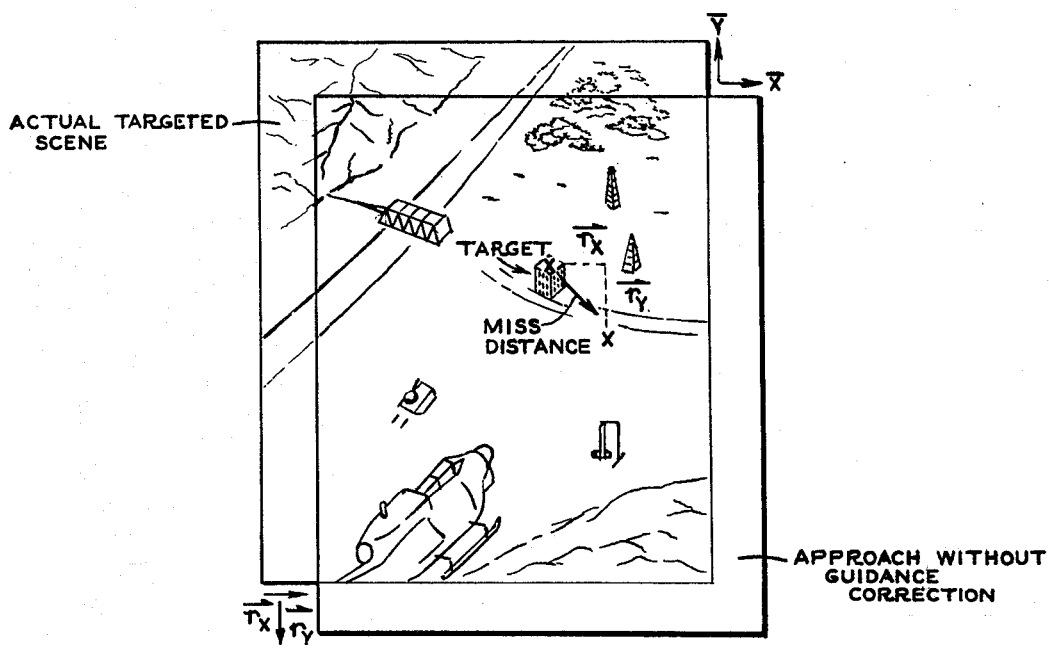

FIG. 6 is a diagrammatic illustration of a target scene.

Figure 7:
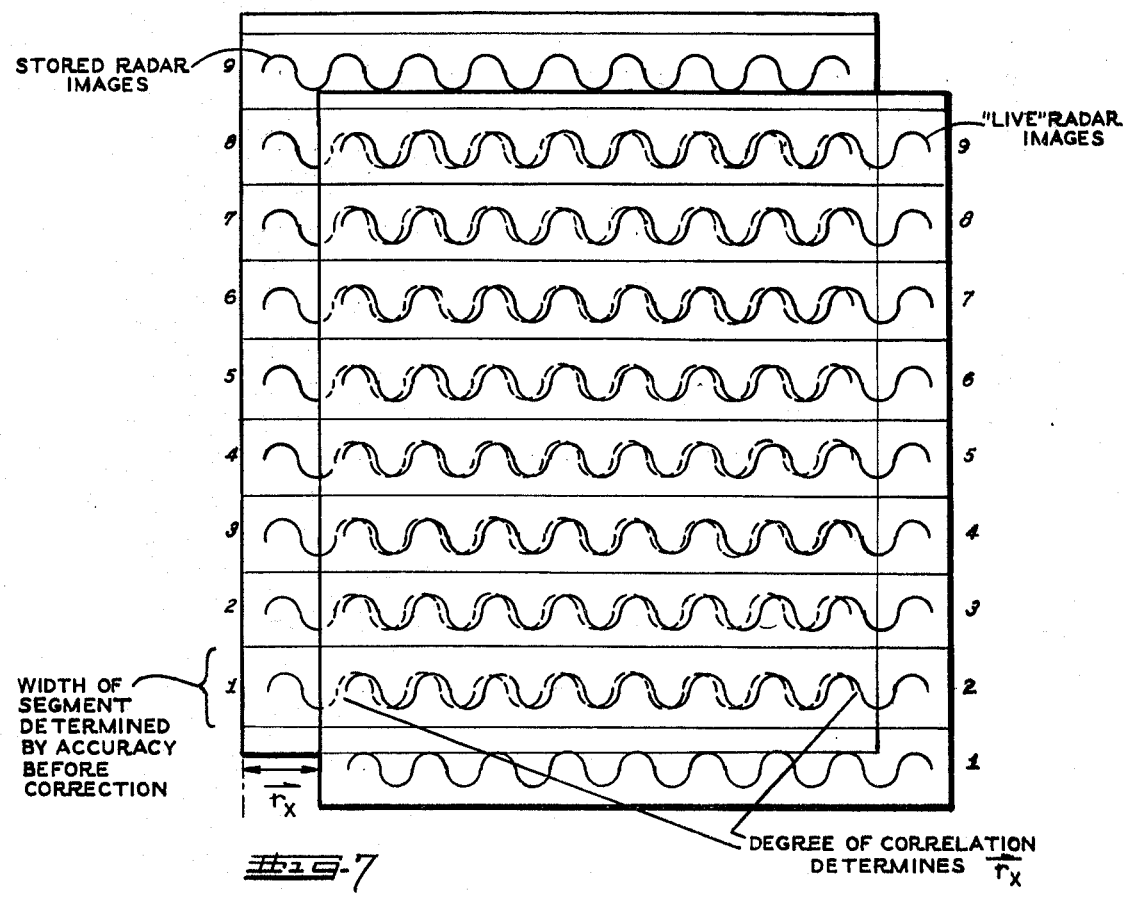

FIG. 7 is a diagrammatic illustration of an array of stored images corresponding to the target scene of FIG. 6 and also of an array of live images corresponding to the scene actually viewed by the airborne vehicle.

FIGS. 8A–8F are comprised of representations of oscilloscope outputs, showing that the peak of the correlation function is displaced as a function of translational error.

Figure 9A:
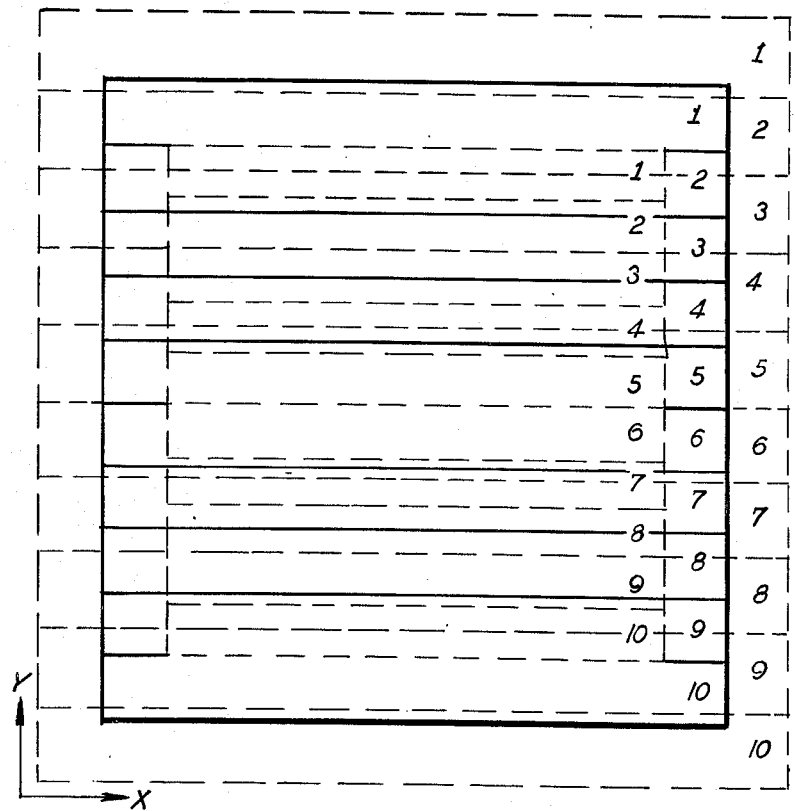
Figure 9B:
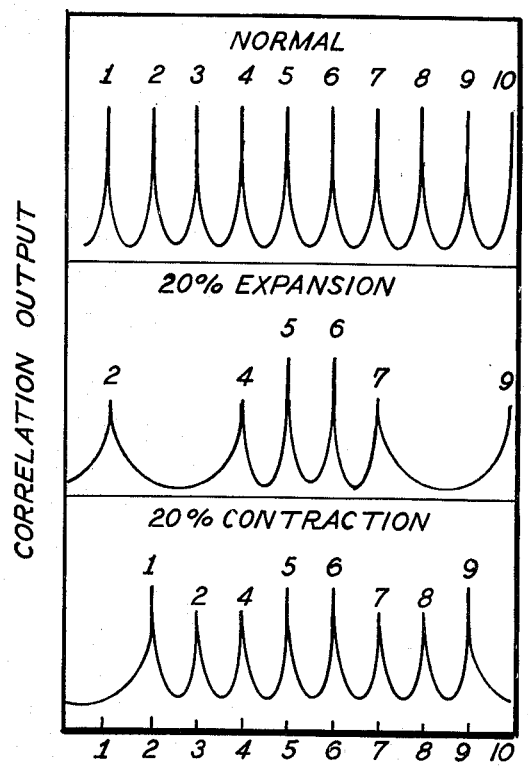

FIG. 9A is a representation of the concept of scale error and FIG. 9B is an illustration of how scale error affects the peaks of the correlation function.

Figure 10:
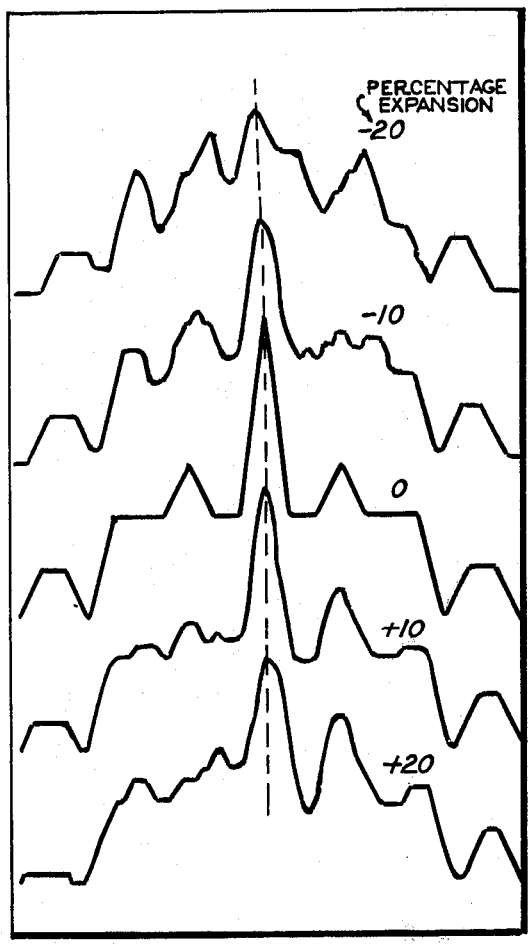

FIG. 10 is an illustration of how scale error affects the correlation peaks in the absence of translational error.

Figure 11A:
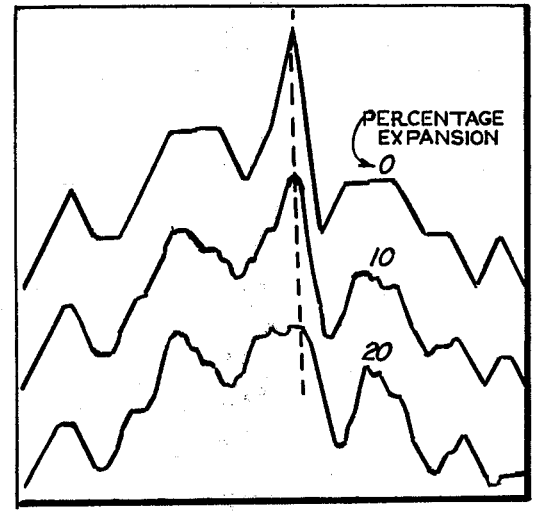
Figure 11B:
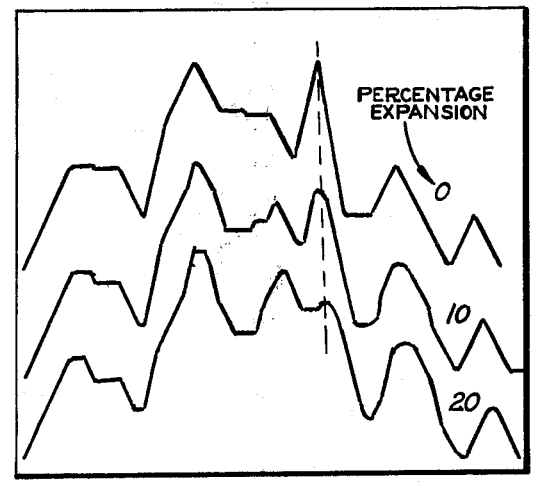

FIGS. 11A and 11B are illustrations of how scale error affects the correlation peaks when translational error is present.

FIG. 12 illustrates a procedure according to the invention for obviating the deleterious effects of scale error.

Figure 13:
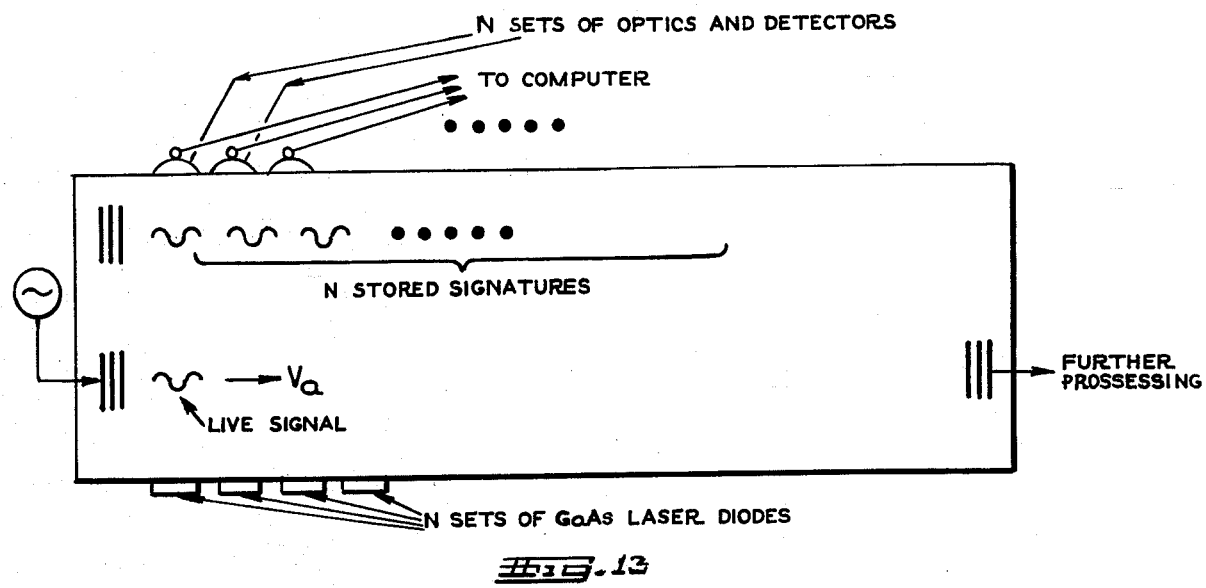

FIG. 13 is a diagrammatic illustration of an acousto-optic correlator device for use in the guidance system of the invention.

Figure 14:
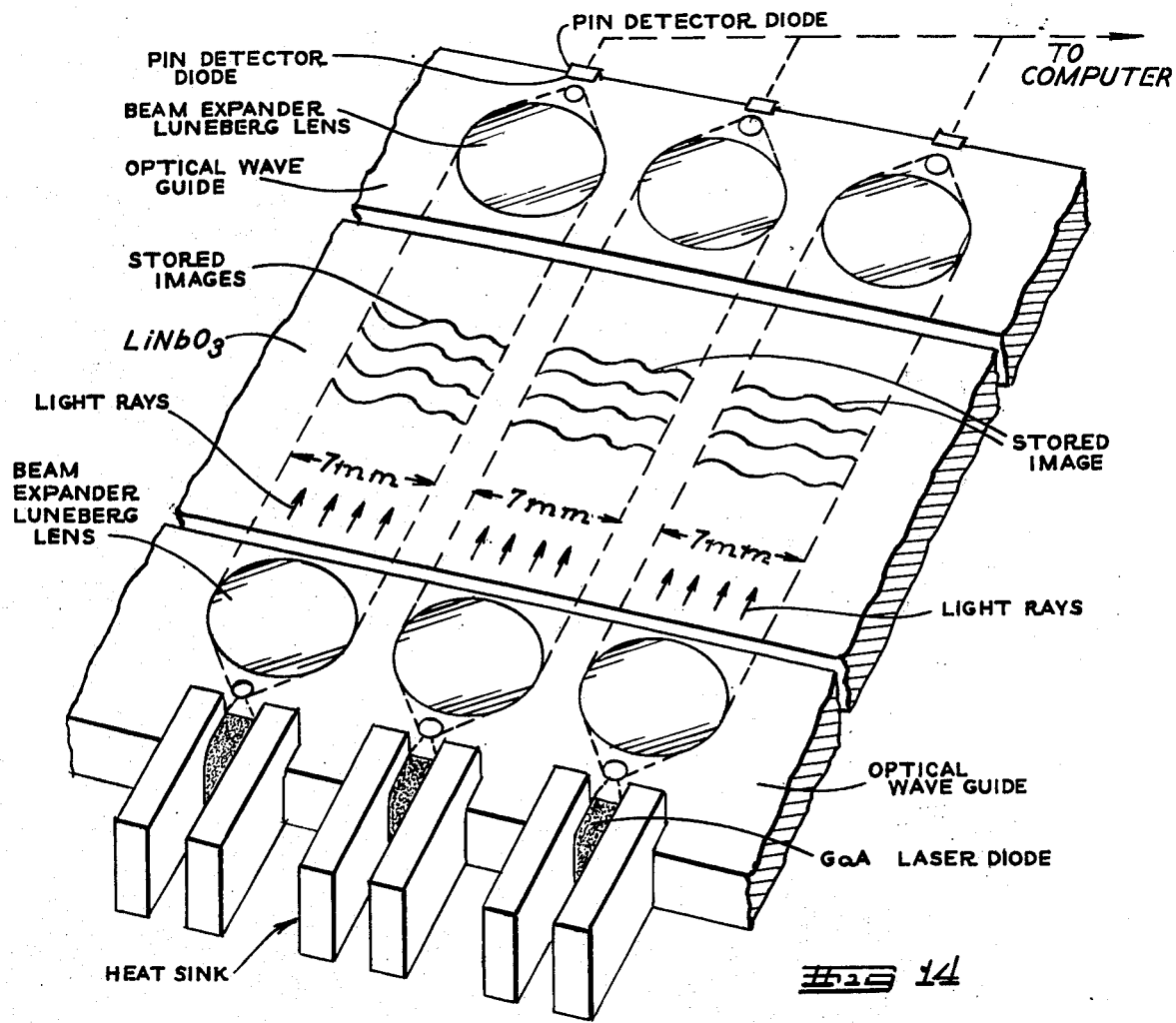

FIG. 14 is a top view of the device of FIG. 13.

Figure 15:
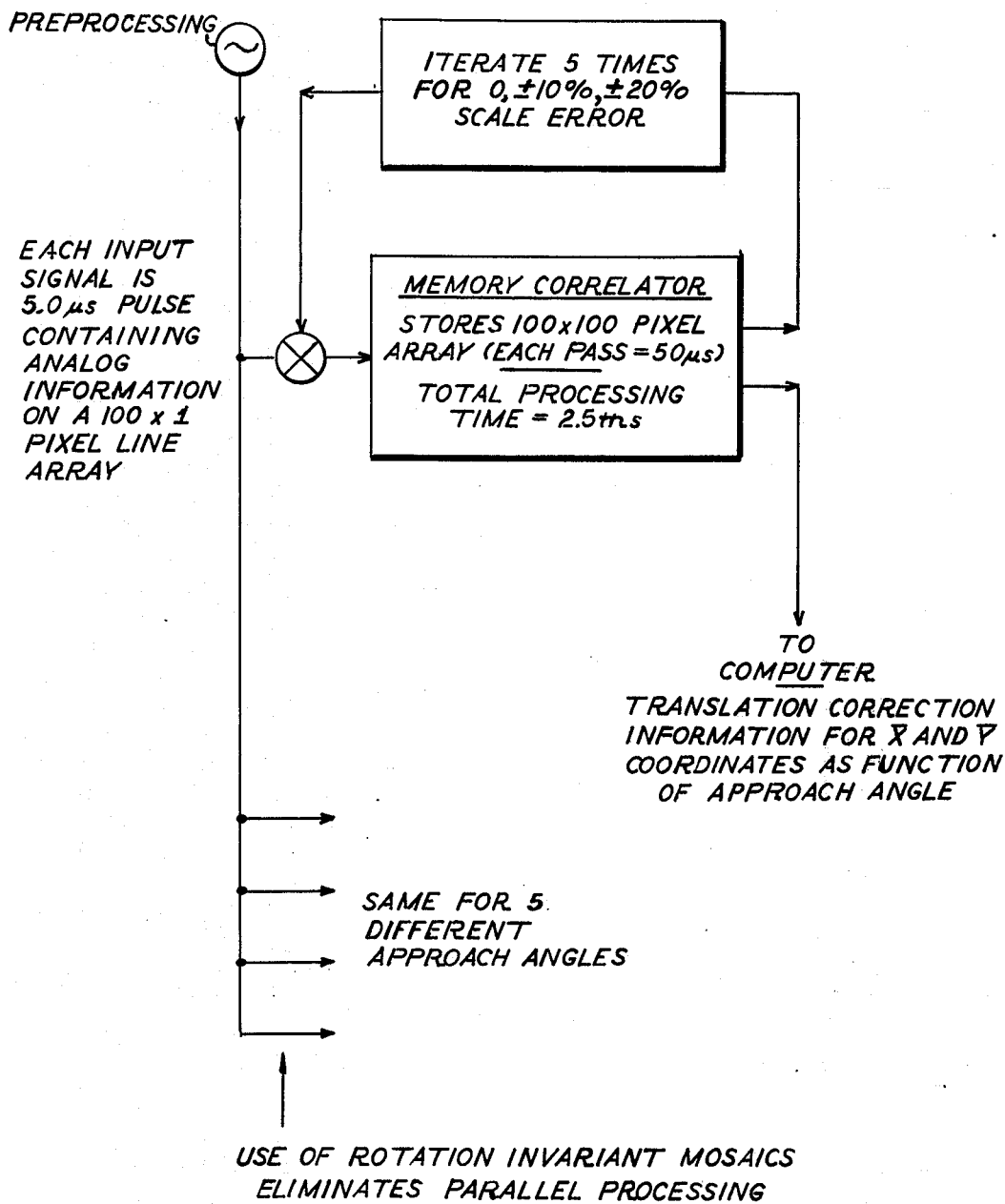

FIG. 15 is a block diagram of the processing scheme of the invention.

The heart of the improved guidance system of the invention is a novel acousto-optic correlator device which is capable of storing signals corresponding to the target scene to which the vehicle is being directed. A similar device is disclosed in co-pending U.S. Patent Application Ser. No. 804,206 and other related techniques and devices useful in the practice of the present invention are disclosed in co-pending U.S. Patent Applications Ser. No. 804,202, and 804,203.

Before describing the present invention, it is necessary to have an understanding of the material disclosed in the above-identified applications.

Historically, the diffraction of light by high frequency sound waves, called Brillouin scattering, was first observed in 1932. The development of the laser and advances in high frequency techniques have increased the practical potential of the acousto-optical interaction phenomenon.

An acoustic wave propagating in a medium causes a spatial change in the index of refraction of the medium as a result of the acoustic strain $s$ according to the relationship:

$$\Delta n = (-n^3 ps/2)$$

where
  $n$ = index of refraction
  $p$ = electro-optic coefficient

A light beam impinging on the acoustic wave is scattered as a result of this index of refraction variation just as if it encountered a diffraction grating. Since the acoustic wave is propagating and momentum must be conserved, the frequency of the light wave is shifted by an amount equal to the acoustic frequency.

Figure 1:
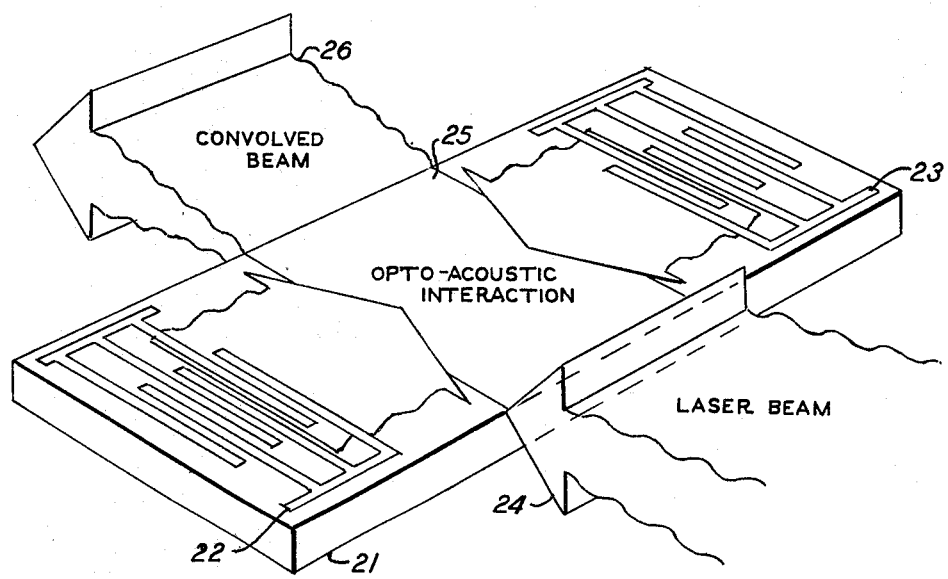
FIG. 1 is a prior art acousto-optic device useful in explaining the background of the correlation devices used in the present invention.

The principles of operation of the memory correlator of FIGS. 2 and 5 are best understood by first referring to FIG. 1, which is an illustration of an acousto-optic convolver, such as is known to the prior art.

The body of the convolver is an elongated sheet of piezoelectric crystal 21, such as lithium niobate. At respective ends of the crystal, acoustic transducers 21 and 23 are disposed, and such transducers are known means for converting an electrical signal to a corresponding acoustic wave. A laser, such as helium-neon laser, is aranged to direct a light beam across the top part of the crystal as shown in FIG. 1.

An electrical signal of the form $A(t)\cos w_1 t$ is applied to transducer 21 and a signal of the form $B(t)\cos w_1 t$ is applied to transducer 23 where $w_1$ is an R.F. frequency signal which is amplitude modulated by the envelopes $A(t)$ and $B(t)$ where $A(t)$ and $B(t)$ are the signals which are to be convolved with each other. The acoustic waves launched by the respective transducers cross each other in the middle area of the crystal. The light beam, which can be represented by $I_o \cos Wt$ traverses the surface of the crystal in the middle area and is diffracted by the acoustic waves. The intensity of the diffracted light beam is of the form $$K^2 I_o(A(t) B(t) \cos (W - 2w_1)t).$$

This doubly diffracted light beam is focussed on a square-law detector diode and the diode output voltage at double the acoustic frequency is $$V_{out} \sim A(t)B(t)\cos(2w_1)$$

If $A(t)$ and $B(t)$ are pulses whose widths are shorter than the interaction region encompassed by the light beam in FIG. 1, then the focussing process is equivalent to an integration with respect to time. Since the two waves are passing each other, the output varies with respect to a delay time $\tau$ where $\tau$ varies from zero, when both pulses overlap, to some maximum value determined by the length of the interaction region. For the conditions described, the output voltage as a function of time is given by $$V_0(\tau) = \int_{-\infty}^{\infty} A(t)B(t-\tau)dt,$$

which is equivalent to the convolution of $A(t)$ and $B(t)$.

As is known, it is frequently more useful to obtain the correlation instead of the convolution of two signals. The correlation is defined as $$V_o(\tau) = \int_{-\infty}^{\infty} A(t)B(t+\tau)dt$$

and as can intuitively be understood on the basis of the above discussion, if one acoustic wave is slowly "slid" past the other wave while travelling in the crystal in the same direction, the correlation of the two waves is obtained.

It is only necessary that one wave travel slowly enough with respect to the other wave so that the faster wave can slide entirely past the slower wave within the length of the crystal. In co-pending Application Ser. No. 804,203, an arrangement was disclosed in which two crystals having different acoustic velocities were utilized and both waves were generated in real time, with the faster wave sliding past the slower wave. According to the memory correlator of FIG. 2, one wave is stored in the crystal and the wave generated in real time slides past the stored wave to effect the correlation.

The methods provided by the invention for storing signals in piezoelectric crystals will now be discussed.

As mentioned above, the interaction of the light beam with the acoustic wave is a direct result of the spatial change in index of refraction which the acoustic wave produces as a result of the acoustic strain $s$, where $$\Delta n = (-n^3 ps/2)$$

According to the invention disclosed in co-pending Application Ser. No. 804,206, a method is provided for storing in the piezoelectric material a spatial variation in an index of refraction pattern which corresponds to an acoustic wave. Then, correlation can proceed with the stored wave just as with the original wave. Basically, intense second harmonic (SH) laser radiation of 0.53 micron is used to "freeze" a wave, and store it semi-permanently in the crystal.

More specifically, the methods for storing the signal in the crystal are illustrated in FIG. 4. The signals of interest are modulated R.F. signals, the envelope of the composite signal being the signal to be correlated. A representative signal is shown in FIG. 3, wherein the envelope of the composite signal is a rising ramp. As recognized by those skilled in the art, the envelope may be any desired waveshape.

The modulated R.F. signal is generated by a generator 8 in FIG. 4, which can for instance, be a frequency synthesizer which is switched on and off by a pulse generator. The signal is applied to acoustic transducer 9, the exact form of which is known to those skilled in the art, and which converts the electrical signal to an acoustic signal which is propagated across the length of lithium niobate crystal 1. At a selected area of the crystal, a spatially wide, high intensity, short duration laser pulse at 0.53 microns is directed across the surface of the crystal. This effectively "freezes" the propagating waveform in the irradiated area as a spatially varying index of refraction pattern. To accomplish this, the laser pulse must be short compared to the period of an R.F. cycle, and in an illustrative embodiment, the pulse width was approximately 10% of the width of an R.F. cycle. Thus, if the R.F. signal to be stored is at a frequency of 10 MHz, the pulse duration would be 10$ns$, and the laser beam, by way of example, could have an intensity of approximately 1 J/cm$^2$. The 0.53 micron radiation is second harmonic radiation obtained from a 1.06 micron output laser. If the 0.53 micron second harmonic and the 1.06 micron fundamental are utilized simultaneously, a factor of 3 enhancement in the index of refraction change results.

The physical basis for the index of refraction change is believed to be the photocarriers produced by the laser beam. Regions of the material which have a higher density will therefore produce more photocarriers and hence result in larger $\Delta n$. The propagating acoustic wave varies the density, since the dilation $\Delta \rho/\rho$ is equal to the strain s. That is to say, that for the small perturbations with which we are dealing, the nonlinear $\Delta n$ variation resulting from exposure to the high-intensity second harmonic pulse should be proportional to $\Delta \rho/\rho$. So, if we cause an acoustic wave to propagate in LiNbO$_3$ and then expose this to a high-intensity short-duration SH beam, a pattern of spatial variation in $\Delta n$ should result corresponding to the original acoustic signal. Therefore:

$$\Delta n \sim J^2 s/\tau,$$

where
$J = $ energy density in Joules/cm$^2$
$\tau = $ laser pulse width in nanoseconds. The magnitude of the strain $s$ is given by:

$$s \sim \sqrt{2P_s/\rho v^3}$$

where
$P_s = $ the acoustic power density in erg-sec/cm$^2$,
$\rho = $ density $= 4.64$ f/cm$^2$ (LiNbO$_3$), and
$v = $ *acoustic velocity* $\sim 3.5 \times 10^5$cm/sec(LiNbO$_3$).

The maximum acoustic power density which we can utilize is determined by the onset of nonlinearity in the piezoelectric material, i.e., exceeding the Hooke's Law regime of operation. For LiNbO$_3$ this maximum power density is given by $$P_{sm} = 80 \sqrt{F} \text{ (watts/cm}^2\text{)}$$

where $F$ is the frequency in MHz.

Combining the above equations and substituting numerical values yields:

$$\Delta n = 2.7 \times 10^{-8} \times J^2 \tau^{-1} (F)^{\frac{1}{4}},$$

where the factor of 3 enhancement obtained by simultaneous 1.06 micron irradiation has been included. This value for $\Delta n$ assumes that a single pulse has been used. With correct timing many pulses can be utilized, therefore:

$$\Delta n = 2.7 \times 10^{-8} \times \frac{NJ^2}{\tau} (F)^{1/4}$$

where: $N$ = number of pulses.

$$\Delta n = 2.7 \times 10^{-7} \times \frac{NJ^2}{(\tau)^{5/4}}$$

is the maximum change in index of refraction for a given laser pulse width.

Referring to FIG. 4, a second method is illustrated for storing the acoustic wave in a crystal. This method is the same as the first method except that the modulated beam after it traverses the surface of the crystal, is made incident on a second lithium niobate crystal. This has the effect of storing the index of refraction pattern in the second crystal, and the pattern which is stored will be approximately 100 times stronger than the pattern which is stored in the first crystal.

The limitations on the density of stored signals via the above processes are the inherent resolution (4000 lines/mm) and the availability of very short pulse-width lasers. Mode-locked neodymium/glass lasers have a pulse width of 10 ps. This, together with the observed resolution, implies that acoustic signals up to 10 GHz can be stored. Surface acoustic wave technology is presently limited to a few gigahertz, however. If we assume a frequency maximum of 2 GHz and a half cycle as the smallest storable signal, the density of stored images at this frequency would be 10,000 per cm length of $LiNbO_3$. The attenuation of SAW at this frequency is about 10 dB per cm. If we assume that the dynamic range of the acousto-optic correlation is about 60 dB and that we wish to maintain about 30 dB of signal range, we would be limited to about 3 cm or 30,000 stored images. All of these stored images could be scanned and a correlation to any one of them obtained in less than 10 microseconds, which indicates the tremendous potential of the storage device.

If a signal is stored in a crystal according to one of the two above methods, and a second real time signal is then propagated across the crystal so that it "slides" past the stored signal, the correlation of the two signals may be obtained.

Thus, the stored pattern will modulate the laser beam according to $P_s(t)_{stored}$, where the $t$ variable corresponds to the amplitude variation across the length of the signal. The real time signal propagating across the crystal modulates the laser beam according to $P_s(t+\tau)_{real\ time}$, where $\tau$ corresponds to the delay time necessary for the second signal to cross the first signal. The resultant modulated light is hence proportional to the product $P_s(t)_{stored} \times P_s(t+\tau)_{real\ time}$. If the light is then focussed using a spherical lens onto a PIN square-law photodetector diode, the output is proportional to:

$$\int P_s(t)_{stored} \times P_s(t+\tau)_{real\ time}\, dt$$

which is the correlation of the two signals.

FIG. 2 shows an arrangement for obtaining the correlation of a real time signal with the stored signal. Crystal 1 has an index of refraction pattern stored therein as shown, and the real time signal, which would be at the same acoustic or R.F. frequency is provided by Modulated R.F. signal Generator 8. The real time wave is launched by acoustic transducer 9, and is propagated across the stored pattern. A laser beam is directed across the crystal at the area of the stored pattern, and is modulated by the two waves. It is then focussed on square law detector 7, and the output at the acoustic frequency corresponds to the desired correlation. In an actual set-up, a filter at the acoustic frequency would be utilized in the detector circuit.

Optics 5 is an optical configuration, known to those skilled in the art, for providing a wide, thin beam which enters and leaves the acoustic medium approximately perpendicular to the propagating wave. For instance, optics 5 may be comprised of spherical beam expanding lenses followed by cylindrical lenses which expand the beam in the horizontal direction, and focus it in the region of the acoustic medium. Optics 6, which follow the acoustic medium, may be comprised of a cylindrical lens for recollimating the light and a spherical lens for focussing it on the square law photodetector.

According to the arrangement disclosed in FIG. 5, N pairs of signals can be correlated with each other in a single acousto-optic device. This is because of the property that where a number of pairs of signals are present in the device at the same time, where both signals of a pair have the same R.F. frequency, different from the R.F. frequencies of the other pairs, each signal will interact only with the other signal of the pair of which it is one, but will not interfere with signals having different R.F. frequencies. The multiplexing concept is applicable to both the real time correlator and the memory correlator mentioned above, but is illustrated in FIG. 5 with respect to the memory correlator.

In FIG. 5, crystal 46 has a plurality of signals stored therein over the same surface area as overlapping spatially varying index of refraction patterns. The signals may be stored by the same methods described above, but to store N signals, each of bandwidth $\Delta f$ requires a total operational bandwidth of $N\Delta f$, which in practical terms means increasing the bandwidth of the transducers and decreasing the pulse width of the high-powered laser pulse used for storing the signals. A bandwidth of well over a gigahertz should be obtainable.

Each of the stored signals is at a different R.F. frequency, with the frequency spectrum of a set of signals being illustrated at the lower left-hand part of the Figure.

Each of the modulated R.F. electrical signals generated by generators 40 to 44 is at the same R.F. frequency as one of the stored signals. The electrical signals are applied to summing amplifier 45, and from there to acoustic transducer means 47, which results in N acoustic waves being simultaneously propagated across the crystal. As mentioned above, each real time signal interacts only with the stored signal having the same R.F. frequency, and the laser beam is modulated by all of the acoustic waves.

The laser beam traverses the crystal, and is then focussed by optics 48, the exact forms of which are known to those skilled in the art, onto a plurality of spaced photodetectors. Each of the correlation signals exits from the optics at an angle $\theta$ away from the adjacent signal where $$\theta = \frac{\lambda_0 \Delta f}{2v_a},$$

$\lambda_0$ being the wavelength of the laser light and $v_a$ being the acoustic velocity. Thus, the correlation signals are effectively separated from each other, and each can be directed to a different photodetector 49, for independent processing, if desired. For a $\Delta f$ of 40MHz, $\theta \approx 0.2°$ and since detector diodes can be made as small as a mil in diameter, the difference in angle is sufficient for separating the signals. Each photodetector is connected to a separate band pass filter 50, each filter having a center frequency equal to the R.F. frequency of a different processed signal.

The guidance system of the present invention will now be described with reference to FIGS. 6–15.

As is known, the object of a terminal guidance system is to automatically and accurately direct an airborne vehicle to a target. Typically, live information received from a scene being viewed by the vehicle is processed, and error information is converted into control signals by a computer.

A simulated target scene is shown in FIG. 6. The guidance problem is to determine the error vectors $\dot{r}_x$ and $\dot{r}_y$. We will consider the use of the memory correlator described above for solving this problem. While the scene is two-dimensional, the correlator is essentially a one-dimensional processor. The method of utilizing a one-dimensional device to solve a two-dimensional problem is to divide the scene into slices as is shown in FIG. 7. Each slice is represented by an analog signal which can be, for example, the reflectivity as a function of $x$, and each signal basically represents the reflectivity of a one-dimensional array of "pixels" (picture elements). While in FIG. 7, the stored images are shown as sine waves, in a real situation the stored signatures would be complex functions. The "live" images are correlated with the stored signals, and the degree of correlation determines the error $\dot{r}_x$ as will be discussed subsequently. The error in the $y$ direction ($\dot{r}_y$) is ascertained by determining which "live" slice corresponds best with which stored segment. For the example shown, "2" correlating with "1" indicates a shift in the $y$ direction of one line of pixels. This method of performing a two-dimensional correlation, viz., obtaining $x$ and $y$ information separately is entirely equivalent to a simultaneous approach. In fact, the method has the advantage that the rotational errors, which will be considered later, are minimized, since a smaller slice is being correlated at any one time.

Figure 8A:
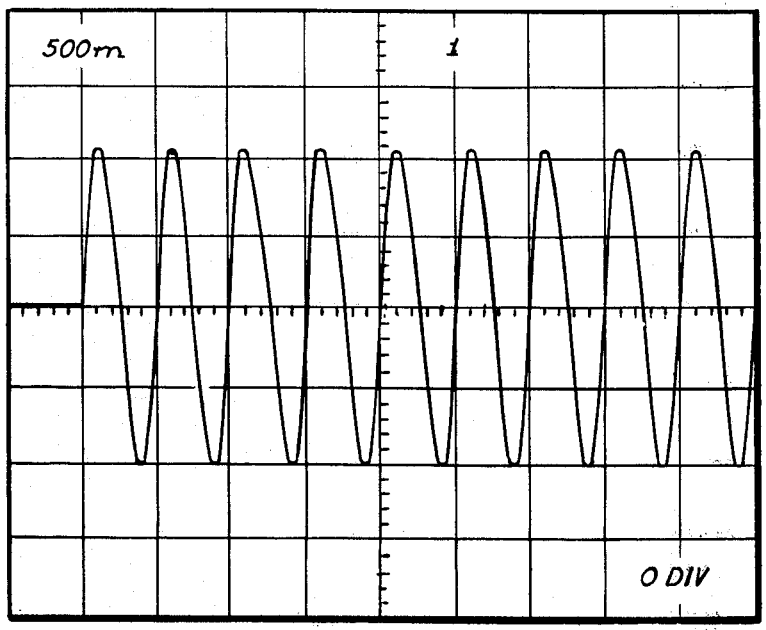
Figure 8B:
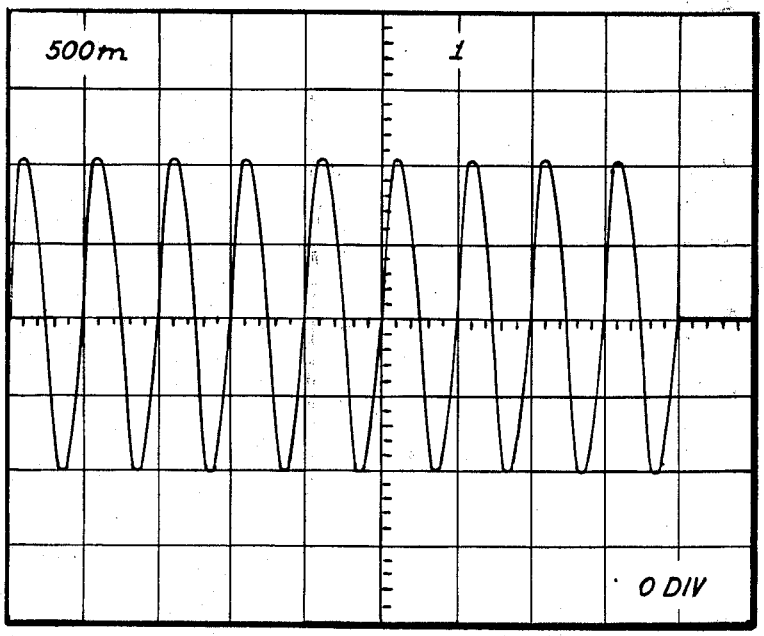
Figure 8E:
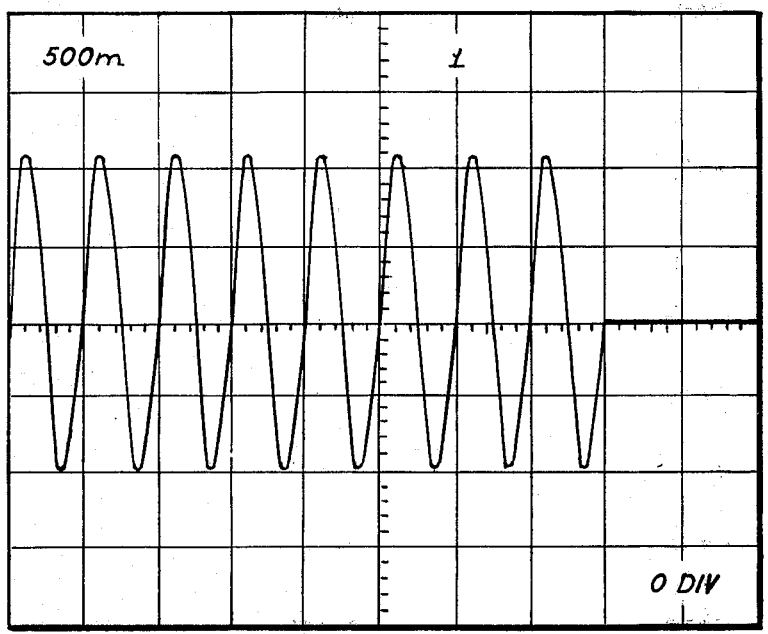
Figure 8F:
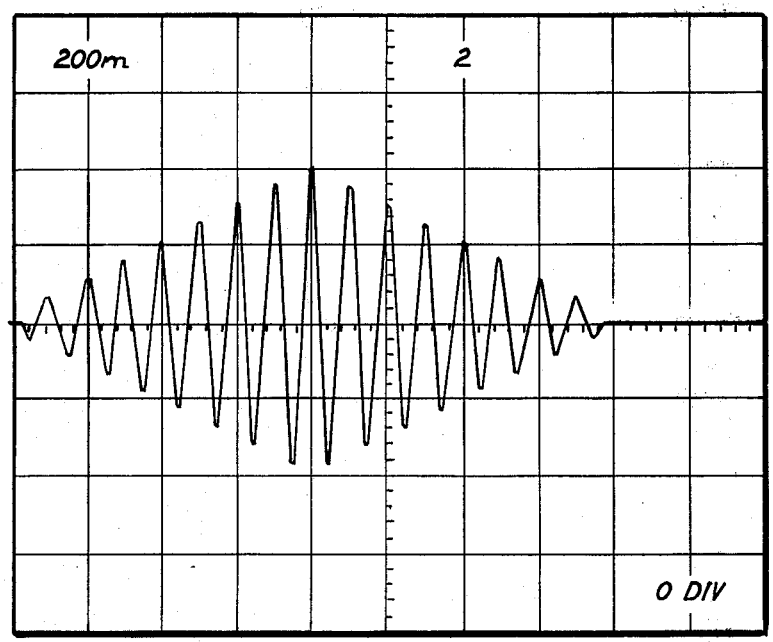

The determination of the translational errors is based on the fact that when the live signals are correlated with the stored signals, the position of the peaks of the correlation functions become displaced as a linear function of the translational error. For example, FIG. 8C shows the correlation of the two sine waves of FIGS. 8A and 8B, which are translated with respect to each other. The translational error is simulated by setting to zero part of the left-hand side of one of the sine waves and a corresponding part of the right-hand side of the other sine wave. The correlation has its peak in the center ($\tau = 0$), and as the translational error increases, the peak moves to the left. In the sine waves of FIGS. 8D and 8E, the translational error is greater, and it is seen that the peak of the correlation function of FIG. 8F is further displaced than in FIG. 8C. For the case of repetitive waveforms, both the amplitude and displacement of the peak are linear functions of the translation error, and for non-repetitive waveforms, the amplitude variation of the peak is no longer linear, but the displacement of the correlation peak remains a linear function of the translational error. Hence, subpixel interpolation can be utilized with this method, probably to within a third of a pixel.

In an operational system, rotational errors as well as translational errors, must be considered. For the analog processor under consideration, either of two methods can be used to compensate for rotational errors. Either rotational invariant mosaics can be used, or a reference pattern corresponding to each angle can be stored separately, and parallel processing can be used. If a maximum of 5° rotational error is expected, and 1° accuracy is sufficient, this would require five separate references. Since a rotational and translational error is simply a translation in the rotated reference frame, the separate rotational references need only be rotated with respect to the center of the target area, and the displacement of the correlation peak will still yield the translation error. The reference frame which gives the best correlation will correspond to the one with the correct amount of rotation. In other words, that reference which gives the best correlation indicates the amount of rotational error, and the translational error is then determined by the shift of this "best correlation" peak.

The most difficult guidance error for a correlation processor to overcome is scale error. With translational or rotational errors, the correlation peak is not distorted, but is only displaced and/or decreased in amplitude. With a scale error, where the viewed scene is either expanded or contracted, due to the fact that the airborne vehicle is either too close or too far from the target, the correlation peak becomes distorted, and subsidiary peaks become prominent, so that choosing the correct peak from which to derive correlation information becomes a major problem. Let us consider first scale error by itself and then, the more complicated problem of combined scale and translational errors.

FIG. 9A shows a comparison of the correlation output for a normal scene with one having a ±20% scale error. In this Figure, the solid lines indicate the normal scene, and the dashed lines indicate the expanded or contracted scenes. In each case, a 10 × 10 pixel array is assumed, and we have indicated 10 segments, where each segment is a 10 × 1 pixel array. A scale error causes an expansion (or contraction) of the scene in both the $\dot{x}$ and $\dot{y}$ directions. However, as will be shown subsequently, for the type of processing which we are performing, the $\dot{x}$ expansion (or contraction) interferes primarily with correlation peak determination. A method for overcoming the $\dot{x}$ direction expansion (or contraction) will be outlined below. Let us for the moment assume that this can be done. FIG. 9 is concerned with the correlation errors which result merely from the $\dot{y}$ axis expansion (or contraction). FIG. 9B shows the relative correlation output for the correlation of a "live" signal with a stored segment. The numbers in the figure indicate which "live" segment correlates best with the stored segment whose number is given on the horizontal axis. For the normal signal, each "live" segment correlates well with the corresponding stored segment. For a 20% expansion, corresponding to the vehicle being 20% too close to the target, "live" segments 5 and 6 provide the best correlation peaks. The case of a 20% contraction is illustrated below. The main point is that when scale error occurs, the pattern of correlation peaks differs from that obtained in a "normal" situation. In general, there are fewer correlation peaks, but the expansion or contraction in the ẏ-direction should not prevent the system from obtaining correlation peaks, and these peaks can then be used to determine the translational and rotational errors.

Let us now consider the problem of scale error in the $\dot{x}$-direction, the satisfactory solution of which was assumed in the above discussion. To study this problem, a series of computer-simulated studies were performed with signals consisting of a random ten-bit code. In FIG. 10, the correlation functions are shown for various values of expansion and contraction, when there is no "shift" or translational error. It should be observed that even without any translational error, the main correlation peak may shift slightly. The expansion may also cause a broadening of the peaks, and give prominence to the side peaks.

FIG. 11 shows the results of the computer simulation for the case of simultaneous scale and translational errors. The complications stated earlier, that the main correlation peak becomes less well defined and that subsidary peaks emerge, are both greatly enhanced when translational errors are also present. For a 20% shift, the main peak is very different to detect. FIG. 11 indicates that the position of the main correlation peak remains relatively unchanged as a result of scale error. Thus, if it had shifted 20% as a result of a 20% translational error, its shift as a result of both translational and scale errors would be about the same. Therefore, once the main peak has been identified, the problem of determining the translational error becomes straightforward. The translational error is, after all, the relevant error in the guidance problem.

In addition to the dulling of the peaks, scale error causes a small shift of the main correlation peak which may cause an error in the determination of the translation unless compensated for.

According to the invention, a method to overcome both of the deleterious effects of scale error is shown in FIG. 12. In the disclosed technique of signal processing, a modulation, related to some characteristic feature of the target, eg., the reflectivity of a one-dimensional pixel array, is impressed upon an rf carrier. We propose to compensate for the scale error by increasing (or decreasing) the data rate at which the modulation signal is impressed on the carrier, thereby effectively contracting (or expanding) the modulation signal with respect to the stored reference. For example, if the "live" signal is 20% larger than the reference wave, as indicated in FIG. 12, increasing the data rate by 20% would effectively contract the "live" signal, so that a direct correlation (without scale error) with the reference signal could be obtained.

In operation, if a scale error were detected, eg., by a general dulling of the features of the correlation output, the signal would be passed through the correlator again at a different data rate. If the correlation results become worse, a change of data rate in the opposite direction would be tried on the next pass, etc. A maximum of five iterations would be sufficient to largely eliminate the effects of scale error.

An actual device according to the invention for performing the above-described correlation process is shown in FIGS. 13 and 14. The device preferably utilizes a LiNbO$_3$ crystal and integrated laser diodes and detectors.

Each pair of laser and detector diodes comprises a memory cell, and a radar signature can be stored in the crystal therebetween. The optical wave guide (a Corning 7059) and Luneberg lens set serve to form the thin but wide beam necessary for interacting with the surface acoustic wave.

In one embodiment, 5 $\mu$s signal would be stored between each laser diode and detector. Since the reflectivity may be contained in a four-bit word, a minimum of a 40 MHz information bandwidth would be required where a 5 $\mu$s wide signal is used, even if single-sideband techniques can be utilized to reduce bandwidth. An 18 cm long crystal is the maximum length which could be used. This would allow for the storage of 10 5-$\mu$s wide signals, each one of which would correspond to one of the stored image lines in FIG. 7. Each live signal which is propagated across the N stored signatures corresponds to one of the N live image lines in FIG. 7. Thus, the live images are sequentially propagated across the set of stored images. The specific live image which best correlates with a specific stored image is indicative of the y error, and the degree of the correlation, or displacement of the correlation function peak is indicative of the x error. Since it would be desirable to store a hundred such signals instead of 10, the frequency-multiplexing technique discussed above could be utilized to accommodate 100 × 100 pixel array. If we consider a total bandwidth of 400 MHz, which would still be consistent with the 18 cm crystal length, 10 signals could be stored in each position, and the entire 100 × 100 pixel array could be accommodated in one crystal.

Use of the frequency multiplexing technique for storing signals would not necessarily shorten the processing time. For the 18 cm, 400 MHz bandwidth device, a single transit to process 10 signals would require 50 $\mu$s. To process the next set of 10 signals, the frequency would be changed, and another 50-$\mu$s transit would be required. A total of 500 $\mu$s would be required for the entire 100 × 100 pixel array. Assuming five iterations for eliminating scale error effects, the entire processing would require 2.5 ms. If higher processing speed were desired, all of the multiplexed signals could be processed simultaneously using the scheme shown in FIG. 5. The volume required by the 18-cm device would be about 30 in$^3$, and the power consumption would be about 2 W. A block diagram of the entire system is shown in FIG. 15.

It should be noted that while the above is described in conjunction with the acoustic memory storage device discussed above, a system utilizing either the real-time convolver or the 2-crystal correlator would also be possible. These systems however, would require an additional memory, since the devices utilized do not store signals.

The scheme discussed above is simply a two-dimensional correlation approach where the "live" reflectivity as a function of x and y are compared to a stored reference image. The accuracy of the correlation can be enhanced greatly if the third dimension, viz., height, is also included.

In this case the response would be the reflectivity (G) as a function of the three variables x, y and z. As would be expected, there is a greater certainty in the accuracy of the correlation if all three dimensions are included rather than just two. It is possible, using both amplitude and frequency modulation to approach a 3-D scheme.

As will be explained, since it is not truly 3-D, the approach has been designated as "2½D". We may divide the entire scene into N "N × 1" pixel arrays so that G(x, y, z) is separated into G(x, z)$_1$, G(x, z)$_2$, etc. This is similar to our earlier approach in the two-dimensional case, except that now the "N × 1" pixel array contains information on both reflectivity and height for each pixel position. The height, H, however, is not an independent quantity but is itself a function of position, i.e., reflectivity and height are both functions of position, therefore G(x, z) ≡ G(x, H[x]). The value of reflectivity is therefore a unique function of position only. Let us therefore assume that G(x, H[x]) can be approximated by G(x) · H(x) and associated the reflectivity with an amplitude, and the height with a phase. We then use the reflectivity to amplitude-modulate our signal and the height to simultaneously frequency-modulate the same signal. It has been proven that when this is done, the degree of correlation depends on both modulations.

In actuality, the resulting correlation of a signal that is both amplitude and frequency modulated is approximately the product of the AM autocorrelation and the FM autocorrelation. This can be shown if we assume a simple sinosoidal modulating function for both the AM and the FM. Let the carrier frequency be $\omega_0$, the AM frequency $\omega_A$ and the FM index and frequency be $m$ and $\omega_F$ respectively. Then $$R(\tau)_{AM+FM} = \frac{1}{T} \int_{-\frac{T}{2}}^{\frac{T}{2}-\tau} [e^{i\omega_0 t} e^{i\omega_A t} e^{im\cos\omega_F t}] \times$$

$$[e^{-i\omega_0(t+\tau)} e^{-i\omega_A(t+\tau)} e^{-im\cos\omega_F(t+\tau)}] dt$$

$$= \frac{1}{T} e^{-i(\omega_0+\omega_A)\tau} \int_{-\frac{T}{2}}^{\frac{T}{2}-\tau} e^{im(a\cos\omega_F t + b\sin\omega_F t)} dt$$

where $T$ is the pulse width, $a = (1 - \cos\omega_F\tau)$ and $b = \sin\omega_F\tau$.

The integral is a sum of Bessel functions of zero order. Without evaluating the integral, let us denote it as Int ($\tau$). Therefore $$R(\tau)|_{AM+FM} = \frac{1}{T} e^{-i(\omega_0+\omega_A)\tau} \text{Int}(\tau).$$

Similarly, $$R(\tau)|_{AM} \times R(\tau)|_{FM} =$$

$$[\frac{1}{T} \int_{-\frac{T}{2}-\tau}^{\frac{T}{2}} e^{i\omega_0 t} e^{-i\omega_0(t+\tau)} e^{i\omega_A t} e^{-i\omega_A(t+\tau)} dt] \times$$

$$[\frac{1}{T} \int_{-\frac{T}{2}-\tau}^{\frac{T}{2}} e^{i\omega_0 t} e^{-i\omega_0(t+\tau)} e^{im\cos\omega_F t} e^{-im\cos\omega_F(t+\tau)} dt] =$$

$$[e^{-i(\omega_0+\omega_A)\tau}(1 + \frac{\tau}{T})] \times [\frac{1}{T} e^{-i\omega_0 t} \text{Int}(\tau)]$$

Therefore:

$$R(\tau)|_{AM} \times R(\tau)|_{FM} =$$

$$\frac{1}{T} e^{-i(2\omega_0+\omega_A)\tau} \text{Int}(\tau)(1 + \frac{\tau}{T}) = R(\tau)|_{AM+FM} e^{-i\omega_0\tau}(1 + \frac{\tau}{T})$$

In other words, the correlation of a signal that is simultaneously frequency and amplitude modulated is identical to the product of the AM and FM autocorrelations for small $\tau/T$, except that the product correlation has twice center frequency. We have verified this by computer simulations. The main criterion as to the effectiveness of the simultaneous use of the AM and FM is determined by their degree of decoupling from each other. The greater the decoupling, the better the information obtained.

True three-dimensional correlation is also feasible using acoustic-optic memory correlation techniques. That is, an error signal can be obtained as a function of x, y and z. This requires utilization of the frequency multiplexing and the simultaneous multisignal processing scheme described above. Instead of using the multiplexing approach to increase the storage density, it can be used to store the equivalent of a three-dimensional array. The array G(x, y, z) would be divided into N "2D" arrays, G(x, z)$_n$. The number N would correspond to the number of pixels in the y direction, eg., 100. At each memory cell "n", we would store a frequency-multiplexed signal corresponding to the array G(x, z)$_n$. Using the multisignal processing approach of FIG. 5, there would be M outputs for each signal, where M corresponds to the number of pixels in the z direction, ie., 16. Such a system would require about a 650 MHz bandwidth and 10 18 cm long crystals. The time required to process the 100 × 100 × 16 pixel array would be 500 μs. The iterative procedure proposed to counteract scale errors could also be utilized in this situation and the processing time would be increased accordingly.

A brief overview of the type of computer that would be required with the guidance system of the invention will now be described. Since we process only one scene every 5 μs, and because the resulting guidance calculations utilize simple alogrithms involving uncomplicated trignometric functions, an MOS microprocessor should be able to handle the job. In the case of the 400 MHz bandwidth approach, where each device would have 10 memory cells and each cell would store 10 5-μs signals multiplexed together, the output of each cell would be fed to a comparator, counter, and A to D converter which in turn would send two words to the computer. One 4 bit word would correspond to the height of the correlation peak and an eight bit word would correspond to the position. If translation errors no greater than 20% are expected, this approach together with the subpixel interpolation capability of the correlation scheme would provide the required system accuracy. The package of comparator, counter, and A to D converter would be quite inexpensive. The computer could consist of five boards, a ROM for program storage, look up tables, etc., two 1K RAM's for temporary memory, a CPU and an I/O board with direct memory access capability. This same setup would be sufficient for the iterative procedure proposed for negating the scale errors. In this case, three peaks in the vicinity of $\tau = 0$ would be inspected for sharpness. Three points on each peak would be sent to the computer for comparison. After each iteration it would be determined if the relative amplitude and sharpness of the peaks had changed, and further iterations would be performed as necessary.

The computation time per iteration would be 1.8 ms which is in addition to the 500 μs required for correlation. Assuming a maximum of five iterations, the total processing time would be about 12 ms. Once the peaks have been determined, the microprocessor would require about 100 ms to complete all guidance calculations.

We wish it to be understood that we do not desire to be limited to the exact details of construction shown and described, for obvious modifications can be made by a person skilled in the art.

We claim:

1. An acousto-optic correlation device for use in a terminal guidance system for guiding a vehicle to a target area, comprising
    an elongated acousto-optic crystal having a plurality of storage positions along its length, each storage position corresponding to a one dimensional strip of said target area, each storage area having a signal stored therein as an index of refraction variation pattern, each stored signal corresponding to the variation of a characteristic parameter such as reflectivity of the target area strip which corresponds to the storage position,
    means for sequentially propagating real time acoustic signals across all of said stored signals, said real time signals corresponding to the variation of said characteristic parameter of one dimensional strips of the scene actually being viewed by said vehicle,
    laser means irradiating said storage positions, and,
    a photodetector means associated with each storage position and located so that the laser light from said laser means is incident thereon after traversing said storage positions.

2. The device of claim 1 wherein said laser means comprises a plurality of laser diodes, one for each storage area.

3. The device of claim 1 wherein the data rate of said real time acoustic signals is changed in response to the detection of scale error.

4. The device of claim 1 wherein both said stored signals and said real time signals are amplitude modulated as a function of target and viewed area reflectivity and frequency modulated as a function of target and viewed area height.

5. The device of claim 1 wherein said crystal stores a three dimensional array corresponding to said target area.

* * * * *